(12) United States Patent
Weh et al.

(10) Patent No.: US 7,458,400 B2
(45) Date of Patent: Dec. 2, 2008

(54) CONNECTIVE COUPLING A DATA INTERFACE

(76) Inventors: Erwin Weh, Siemensstrasse 5, 89257 Illertissen (DE); Wolfgang Weh, Siemensstrasse 5, 89257 Illertissen (DE)

( * ) Notice: Subject to any disclaimer, the term of this patent is extended or adjusted under 35 U.S.C. 154(b) by 374 days.

(21) Appl. No.: 10/506,397

(22) PCT Filed: Mar. 1, 2003

(86) PCT No.: PCT/EP03/02113

§ 371 (c)(1),
(2), (4) Date: May 19, 2005

(87) PCT Pub. No.: WO03/074417

PCT Pub. Date: Sep. 12, 2003

(65) Prior Publication Data

US 2005/0211334 A1    Sep. 29, 2005

(30) Foreign Application Priority Data

Mar. 2, 2002    (DE) .......................... 202 03 247 U

(51) Int. Cl.
B65B 1/30    (2006.01)

(52) U.S. Cl. ................... 141/94; 141/83; 141/347; 141/351; 174/47

(58) Field of Classification Search ............ 141/83, 141/94, 98, 206, 346, 347, 351, 382–386; 174/47

See application file for complete search history.

(56) References Cited

U.S. PATENT DOCUMENTS

| | | | |
|---|---|---|---|
| 2,070,013 A | 2/1937 | Krannak | |
| 2,092,116 A | 9/1937 | Hansen | |
| 2,742,052 A | 4/1956 | McKee | |
| 3,077,330 A | 2/1963 | Lampbear | |
| 3,112,765 A | 12/1963 | Crissey et al. | |
| 3,240,520 A | 3/1966 | Dailey et al. | |
| 3,680,591 A | 8/1972 | Vik | |
| 3,731,705 A | 5/1973 | Butler | |
| 4,109,686 A * | 8/1978 | Phillips | 141/1 |
| 4,181,150 A | 1/1980 | Maldavs | |
| 4,222,411 A | 9/1980 | Herzan et al. | |
| 4,263,945 A * | 4/1981 | Van Ness | 141/98 |
| 4,339,023 A | 7/1982 | Maycock | |

(Continued)

FOREIGN PATENT DOCUMENTS

DE    819366 C    10/1951

(Continued)

OTHER PUBLICATIONS

U.S. Appl. No. 11/632,329, filed Jan. 12, 2007, Weh et al.

(Continued)

*Primary Examiner*—Timothy L Maust
(74) *Attorney, Agent, or Firm*—Knobbe Martens Olson & Bear LLP

(57) ABSTRACT

The aim of the invention is to increase security when connecting a connective coupling (10) used for transferring gaseous and/or liquid fluids, especially for filling motor vehicle fuel tanks, provided with a sliding sleeve (18) in order to lock connecting profile sections, especially collets (15). According to the invention, a data interface, especially a data transmitter (60), is arranged on the sliding sleeve (18).

11 Claims, 1 Drawing Sheet

FIG.1

U.S. PATENT DOCUMENTS

Figure 1:
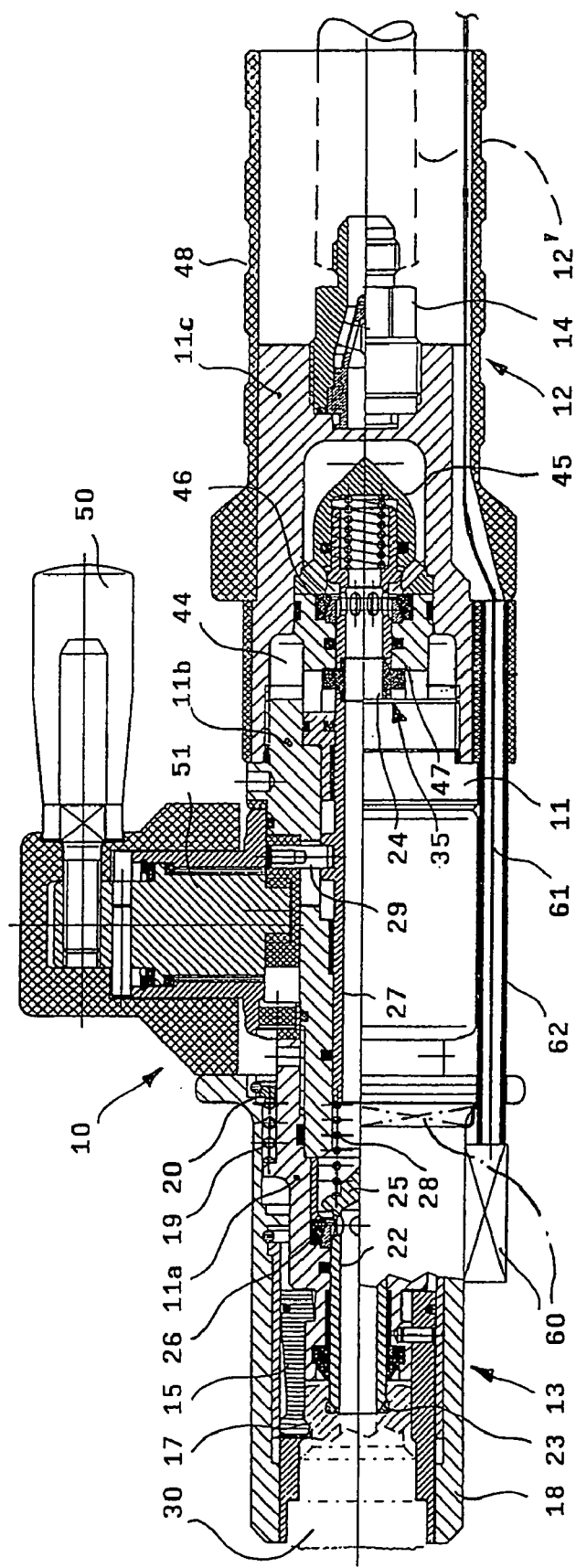

| | | | |
|---|---|---|---|
| 4,347,870 A | 9/1982 | Maldavs | |
| 4,469,149 A * | 9/1984 | Walkey et al. | 141/94 |
| 4,493,475 A | 1/1985 | Baird | |
| 4,934,419 A * | 6/1990 | Lamont et al. | 141/94 |
| 5,014,743 A | 5/1991 | Makishima | |
| 5,080,132 A | 1/1992 | Manz et al. | |
| 5,095,947 A | 3/1992 | Weh et al. | |
| 5,156,198 A * | 10/1992 | Hall | 141/94 |
| 5,249,612 A * | 10/1993 | Parks et al. | 141/219 |
| 5,297,574 A | 3/1994 | Healy | |
| 5,365,984 A | 11/1994 | Simpson et al. | |
| 5,413,309 A | 5/1995 | Giesler | |
| 5,464,042 A | 11/1995 | Haunhorst | |
| 5,604,681 A * | 2/1997 | Koeninger | 700/285 |
| 5,605,182 A * | 2/1997 | Oberrecht et al. | 141/94 |
| 5,647,910 A | 7/1997 | Brown | |
| 5,923,572 A * | 7/1999 | Pollock | 700/282 |
| 6,035,894 A | 3/2000 | Weh et al. | |
| 6,179,300 B1 | 1/2001 | Baumann et al. | |
| 6,202,383 B1 | 3/2001 | Reiter | |
| 6,343,630 B1 | 2/2002 | Dubinsky | |
| 6,394,150 B1 * | 5/2002 | Haimovich et al. | 141/94 |
| 6,649,829 B2 * | 11/2003 | Garber et al. | 174/47 |
| 6,962,177 B1 * | 11/2005 | McCommons | 141/392 |
| 7,394,375 B2 * | 7/2008 | Johnson | 340/572.1 |
| 2002/0069934 A1 | 6/2002 | Peattie | |
| 2005/0161097 A1 | 7/2005 | Weh et al. | |
| 2005/0205141 A1 | 9/2005 | Weh et al. | |
| 2005/0212289 A1 | 9/2005 | Weh et al. | |

FOREIGN PATENT DOCUMENTS

| | | |
|---|---|---|
| DE | 1185938 B | 1/1965 |
| DE | 1226904 B | 10/1966 |
| DE | 198 34 671 | 2/2000 |
| DE | 20317914 U1 | 12/2004 |
| EP | 0039977 | 11/1981 |
| EP | 0 487 844 | 6/1992 |
| FR | 1055252 A | 2/1954 |
| WO | WO 88/01601 A | 3/1988 |
| WO | WO 93/20378 | 10/1993 |
| WO | WO 98/04866 | 2/1998 |
| WO | WO 98 05898 | 2/1998 |
| WO | WO 99/02913 | 1/1999 |
| WO | WO 00/52378 A1 | 9/2000 |

OTHER PUBLICATIONS

U.S. Appl. No. 11/915,260, filed Nov. 21, 2007, Weh et al.

\* cited by examiner

CONNECTIVE COUPLING A DATA INTERFACE

The invention relates to a connection coupling for transferring gaseous and/or liquid fluids, especially for filling motor vehicle gas tanks.

Such connection couplings are to ensure a secure transfer of a fluid from a pressurized source, e.g. from a filling station to a vehicle. The particularly important aspect in this respect is the simple and secure ability to operate the same, so that even in case of refueling pressures of 200 bars and more, easy handling is ensured.

Such a connection coupling is described in WO 98/05898 of the applicant, with the quick-action connection coupling having a housing with a fluid inlet and a fluid outlet as well as several valves in order to ensure a secure sealing of the quick-action connection coupling until the complete establishment of the connection. Said valves are switched after the attachment of the quick-action connection coupling by twisting a control lever in a predetermined sequence, with the discharge valve being opened first by sliding the quick-action connection coupling onto a connection nipple, whereupon following further movement of the control lever the collet chucks acting as locking elements are closed and finally the inlet valve is opened. The control valve is in engagement via an eccentric shaft with the sliding sleeve for activating the collects and with a sealing piston which also releases the fluid inlet after the performed connection of the connection coupling. The relevant aspect is that the connection coupling and the connection nipple match each other precisely and are adjusted to each other for different types of fluids, so that partly mechanical encodings are provided in order to optionally prevent hazardous confusion or wrong refueling.

The invention is accordingly based on the object of providing a connection coupling which in combination with a simple configuration allows an especially secure handling and connectivity.

This object is achieved by the connection coupling according to the features of claim 1. Preferable further developments of the invention are the subject matter of the dependent claims.

The proposed connection coupling with data interface, especially in the form of a data transmitter, is preferably suitable for the use in a quick-action connection coupling for refueling natural gas vehicles. An especially simple and compact configuration is obtained because the data transmitter is attached on the outside on the sliding sleeve and is thus able to clearly identify already at the beginning of the connection process the matching of the connection coupling with the connection nipple. In particular, the data interface in the preferred embodiment is capable of transmitting the type of fluid or filling quantity, thus securely preventing wrong refueling and ensuring an especially secure and convenient handling.

A secure guidance is achieved as a result of a data line integrated within the connection nipple along the central portion of the housing and thus a protected, uncomplicated configuration of the connection nipple is achieved. Since the data line can be guided in a preferable manner along a fluid line (which is present anyway) to the base station or refueling system, a simple, twist-free handling is ensured, so that the connection coupling can be connected even by non-professionals with ease.

An embodiment will be explained below in closer detail by reference to the enclosed drawings, wherein:

FIG. 1 shows a side view of a connection coupling with an integrated data interface, with the connection coupling being shown in a longitudinal semi-sectional view and in the connected position with a connection nipple.

FIG. 1 shows a preferred embodiment of a connection coupling 10 in the form of a so-called quick-action connection coupling which is coupled to a connection nipple indicated in this case on the left side. The connection coupling 10 comprises a tubular housing 11 with several mutually screwed-down housing parts 11a, 11b and 11c, with the right housing part 11c being used as the inlet region and the left region as outlet 13 for the forwarding of the fluid to be transmitted to the connection nipple 30. The inlet region 12 comprises a connection adapter 14 to which a fluid line 12' can be connected via a thread for supplying the fluid to be transferred. The connection adapter 14 with an inserted filter sleeve can be configured in adjustment to the fluid to be transferred, especially to the desired feed pressure values, opening cross sections, etc.

Several oblong collet chucks 15 are provided which are arranged in tubular form and which can be spread in a radially outward fashion shortly before the insertion on the connection nipple 30. At the left outer end with inwardly crimped surfaces, the collet chucks 15 comprise engagement profiles 17 which are configured so as to correspond to a groove-like connecting profile section of the connection nipple 30. Its configuration is also described in closer detail in the aforementioned state of the art, so that any further explanation can be omitted. It merely needs to be mentioned for reasons of completeness that in the region of the outlet 13 a sealing piston 22 is inwardly guided which comprises at its front face side a conical sealing surface 23 for sitting close to a sealing ring of the connection nipple 30, so that the gaseous and/or liquid fluid which substantially flows along the central axis of the connection coupling 10 cannot escape to the outside.

An outside sliding sleeve 18 is provided around the collet chucks 15, which sliding sleeve is guided on the cylindrical outside jacket of the housing part 11a which is on the left side in this case and is pre-tensioned with pressure spring 19 in the direction away from the connection nipple 30. The pressure spring 19 rests on a support ring 20 and thus pushes the sliding sleeve 18 towards a control lever 50 with an eccentric shaft 51. A data transmitter 60 is arranged as a data interface on the circumference of the sliding sleeve 18. Its data line 61 leads through a protective tube 62 to the fluid line 12' in order to be fastened along the same, e.g. with cable clips or straps. As a result, data from and to the connection coupling 10 can be transmitted from a stationary refueling system or can be sent to the same in order to control the refueling pressure or flow quantities in adjustment to the employed connection coupling 10 and/or connection nipple 30 and their flow cross sections. Moreover, the locking of the collet chucks 15 and the sliding position of the sliding sleeve 18 can be checked in order to release the refueling process with a respective signal.

The discharge valve 25 provided on the sealing piston 22 seals by means of a sealing ring as valve seat 26 relative to the sealing piston 22 in the closed position. The discharge valve 25 is pressurized by a pressure spring 28 which rests on a switch slide 27 towards the right side. This discharge valve 25 ensures that in the uncoupled position (not shown here) or shortly before the connection of the connection coupling 10 with the connection nipple 30 the fluid supplied through the connection adapter 14 cannot flow out. The position of the sealing piston 22 can also be determined by the data interface, so that the data query preferably occurs via the data transmitter at this time in order to avoid mistakes during refueling.

The switch slide 27 is displaced during the uncoupling of the connection coupling 10 from the connection nipple 30 along the connection coupling axis and thus forms a ventilation valve 35 in combination with a sealing disk 24. The ventilation valve 35 and the switch slide 27 are actuated by pivoting the control lever 50 because the eccentric shaft 51 is coupled with the switch slide 27, namely through the engagement of several bolts 29 which are in connection with an outside ring slide 31.

As can be seen from the connection position of the connection coupling 10 as illustrated here, the engagement profile 17 of the collet chucks 15 is brought into engagement with the connection nipple 30 during the insertion on the connection nipple 30. In this position the data transmitter 60 is in ultimate vicinity of the connection nipple 30, so that in the manner of a proximity switch its magnetic properties for example (or other parameters) can be queried in order to send its size or connection dimensions via the data line 61 to the base station. It can then choose the refueling values that match the respective design of the connection nipple and release or block the same. The data transmitter 60 can also be arranged circularly about the sliding sleeve 18, as is indicated by the dot-dash lines and can also be arranged as a transponder. In this configuration, the data transmitter 60 is preferably shrunk onto the sliding sleeve 18 or embedded in a covering (e.g. in the manner of a shrink-down tubing or a plastic housing).

By moving (pivoting by approx. 180°) the control lever 50 to the position as shown here, the sliding sleeve 18 is pushed over the collet chucks 15 and thus locked. This position can also be determined by the data transmitter 60, especially when the data transmitter 60 is fastened along the sliding sleeve 18 in a protruding way at the front end of the protective tube 62 in order to thus detect the displacing movement of the sliding sleeve 18 relative to the housing 11.

When the pressure is applied (the beginning of the refueling process), the sealing piston 22 is displaced at first to the left (also under the action of spring 28). When it sits close to the sealing surface 23, the valve seat 26 on the sealing piston 22 and thus the discharge valve 25 are opened under displacement of the sealing piston 22 to the right. In this process, the engagement profile 17 has already engaged on the correspondingly configured connecting profile section of the connection nipple 30. As a result of the axial movement of the sliding sleeve 18, the same engages over the radially outer ends of the collet chucks 15, so that they are held in an interlocked way on the connection nipple 30.

For releasing the connection coupling 10 and thus returning the connection position as shown here to the opening position, the sliding sleeve 18 is pushed back by the pressure spring 19 after the twisting of the control lever 50. After a short path, the collet chucks 15 can spread again in a radially outward manner. Since the fluid pressure was interrupted beforehand (e.g. by closing the refueling valves), the sealing piston 22 is pushed here to the right in the direction towards the inlet region 12. This position can also be detected by the data transmitter 60.

The inlet region 12 further comprises an inlet valve 45 with an associated valve seat 46 centrally in the housing 11 or the housing part 11c of the connection coupling 10. The inlet valve 45 is also axially displaceable by the control lever 50 and its eccentric shaft 51 by coupling with the switch slide 27. Said switch slide 27 displaces a valve slide 47 of the inlet valve 45 to the opening position via the sealing disk 24 in the illustrated connection position, so that the fluid flowing in from the inlet region 12 can flow through the valve slide 47 and a pass-through in the sealing disk 24 and the tubular switch slide 27 towards the outlet 13.

When the connection coupling 10 is released, the switch slide 27 is displaced via bolt 29 to the left by twisting the control lever 50 (by approximately 180°), so that the sealing disk 24 can detach from the sealing engagement. The pressure can thus degrade within the connection coupling 10 via the pass-through slots to a pressure compensation chamber 44. Any still applying pressure medium can thus flow via the pressure compensation chamber 44 to a ventilation bore (not shown) which extends parallel to the central fluid passage (through valves 45, 35 and 25) in the housing part 11c of the connection coupling 10. This ventilation bore can open into a second line which is preferably arranged as a return hose and is enclosed by a housing cap 48 like the feed line 12' in order to be used as a handle for easy handling. The vent line and the fluid line 12' which is connected to adapter 14 as well as the data line 61 thus always extend substantially parallel with respect to each other, so that a twisting of the data line 61 during use is prevented.

The invention claimed is:

1. A connection coupling for connecting to a nipple of a tank of a motor vehicle, the connection coupling comprising:
   a front housing part;
   a sliding sleeve for locking connecting profile sections of the connection coupling onto the nipple, the sliding sleeve being movable in a longitudinal direction with respect to the front housing part; and
   a data interface arranged on the sliding sleeve and configured to indicate matching of the connection coupling with the nipple, at least a portion of the data interface being movable in the longitudinal direction with the sliding sleeve.

2. A connection coupling according to claim 1, wherein the profile sections are collet chucks.

3. A connection coupling according to claim 1, wherein the data interface is a data transmitter.

4. A connection coupling according to claim 3, wherein the data transmitter comprises a data line which can be connected with a fluid line.

5. A connection coupling according to claim 4, wherein the data line is guided in the protective tube parallel to the housing.

6. A connection coupling according to claim 3, wherein the data transmitter is provided with a ring-like configuration and is arranged around the sliding sleeve.

7. A connection coupling according to claim 6, wherein the data transmitter is shrunk onto the sliding sleeve.

8. A connection coupling according to claim 3, wherein the data transmitter is embedded in a covering of the sliding sleeve.

9. A connection coupling according to claim 3, wherein the data transmitter is arranged as a transponder.

10. A connection coupling according to claim 3, wherein the data transmitter is fastened to a circumferential surface of the sliding sleeve.

11. A connection coupling according to claim 3, wherein a protective tube is arranged between the front housing part and a rear housing part of the connection coupling.

* * * * *